May 17, 1955
C. V. NASS ET AL
2,708,513
SAND HANDLING APPARATUS
Filed May 4, 1951
8 Sheets-Sheet 2
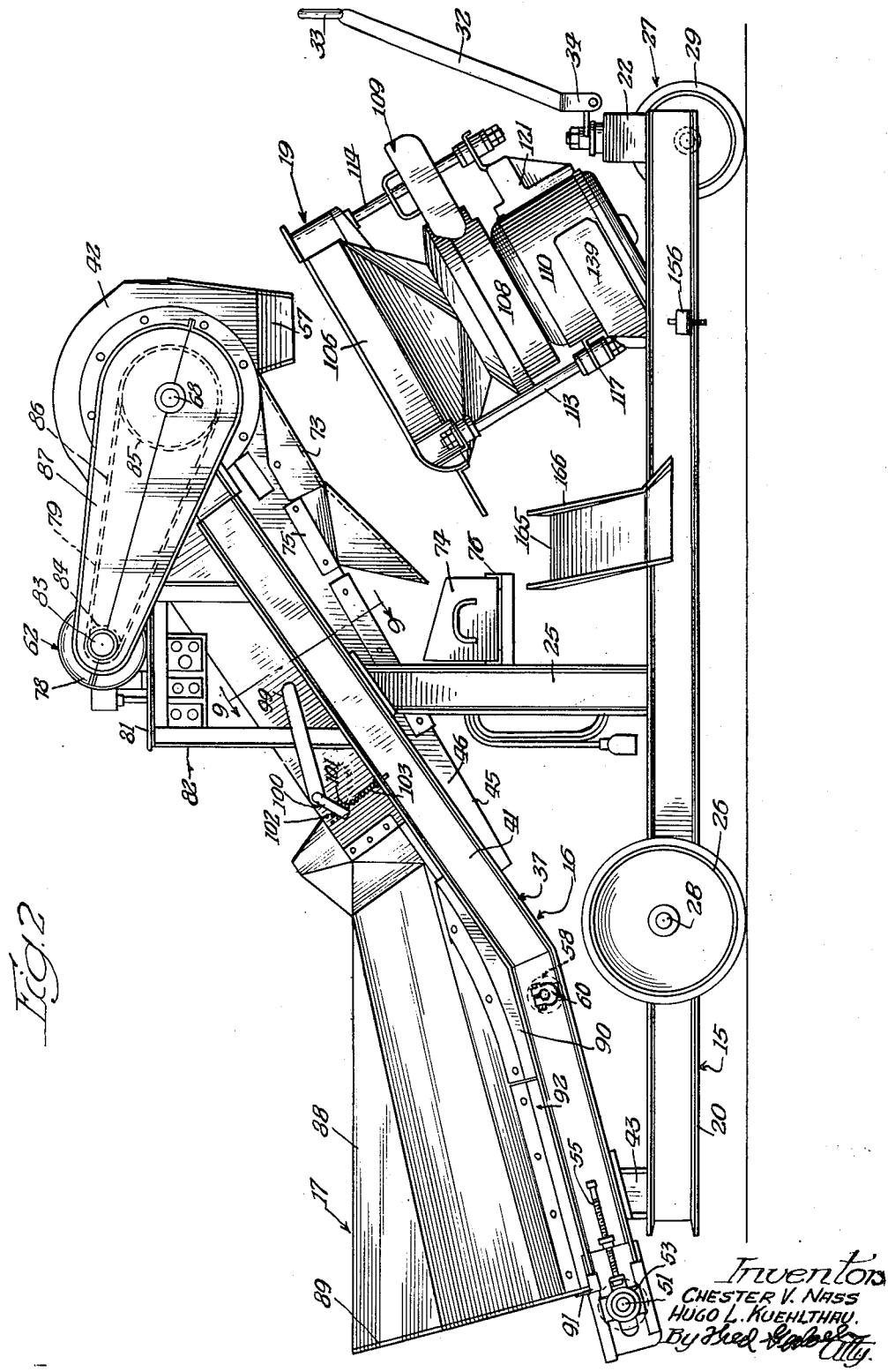
Inventors
CHESTER V. NASS
HUGO L. KUEHLTHAU
By Fred *illegible*
Atty.

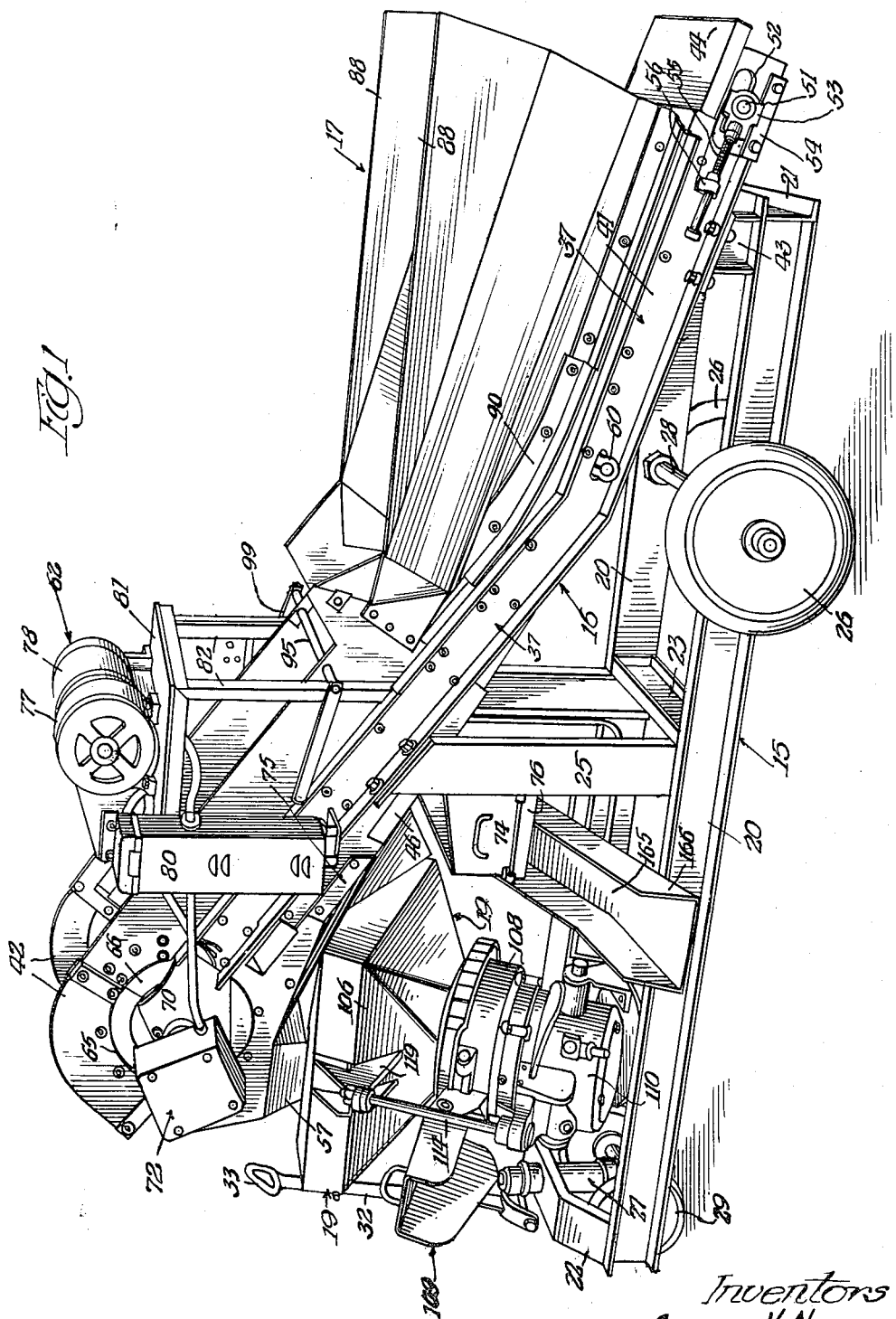

May 17, 1955
C. V. NASS ET AL
2,708,513
SAND HANDLING APPARATUS
Filed May 4, 1951
8 Sheets-Sheet 3
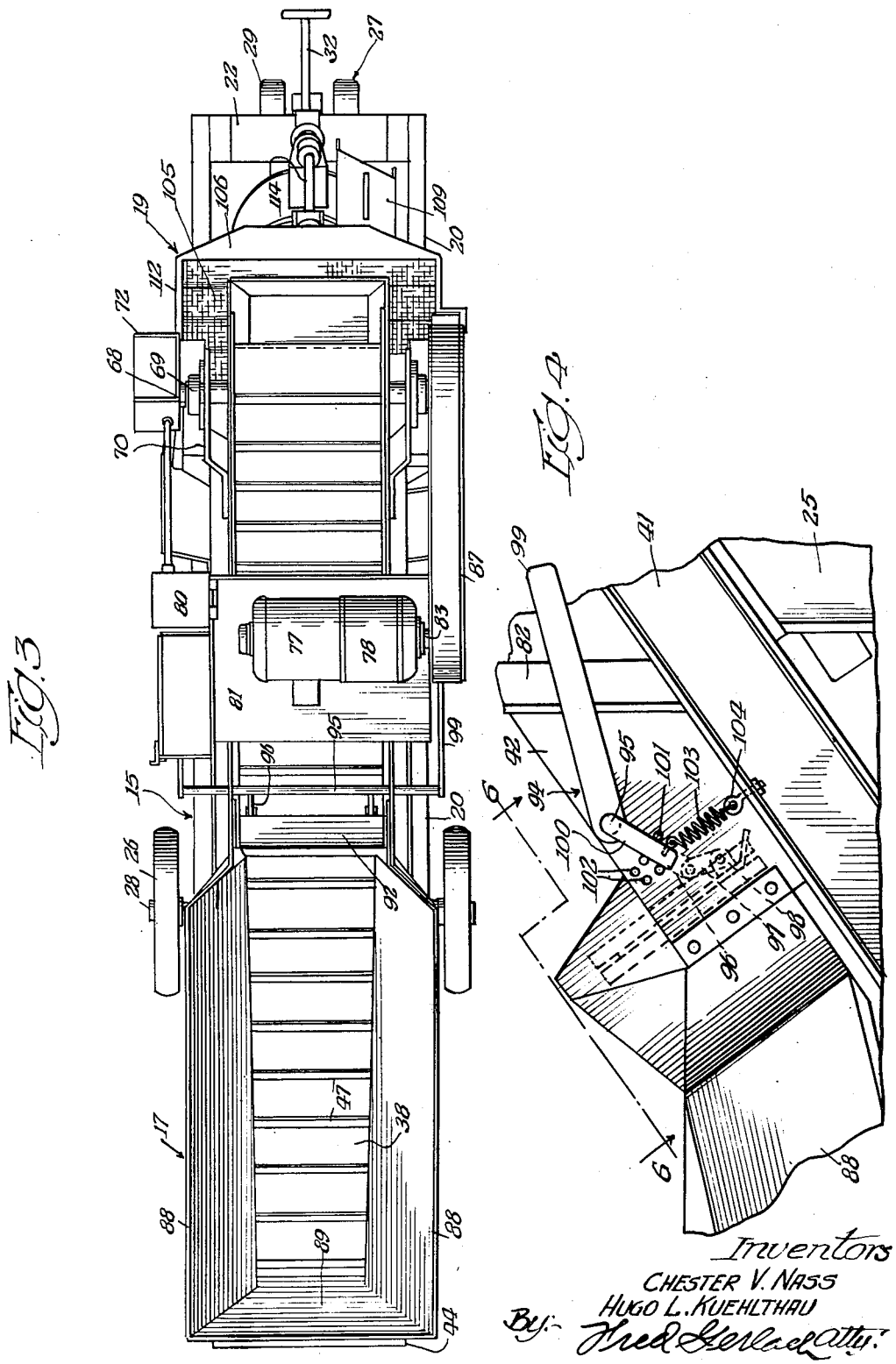
Inventors
CHESTER V. NASS
HUGO L. KUEHLTHAU
By: Fred Gerlach Atty.

May 17, 1955 C. V. NASS ET AL 2,708,513
SAND HANDLING APPARATUS
Filed May 4, 1951 8 Sheets-Sheet 4
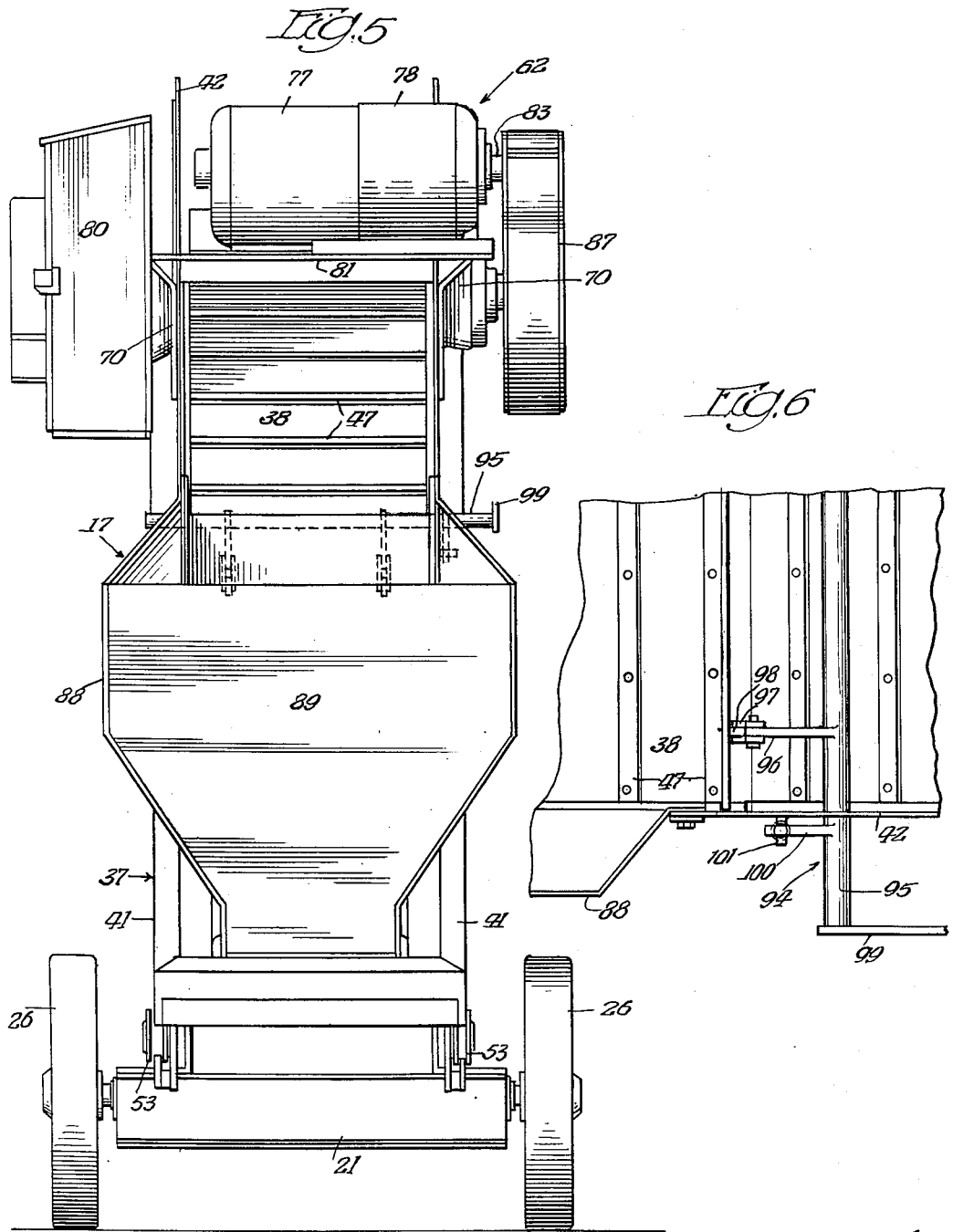
Inventors
CHESTER V. NASS
HUGO L. KUEHLTHAU
By Fred Gerlach atty.

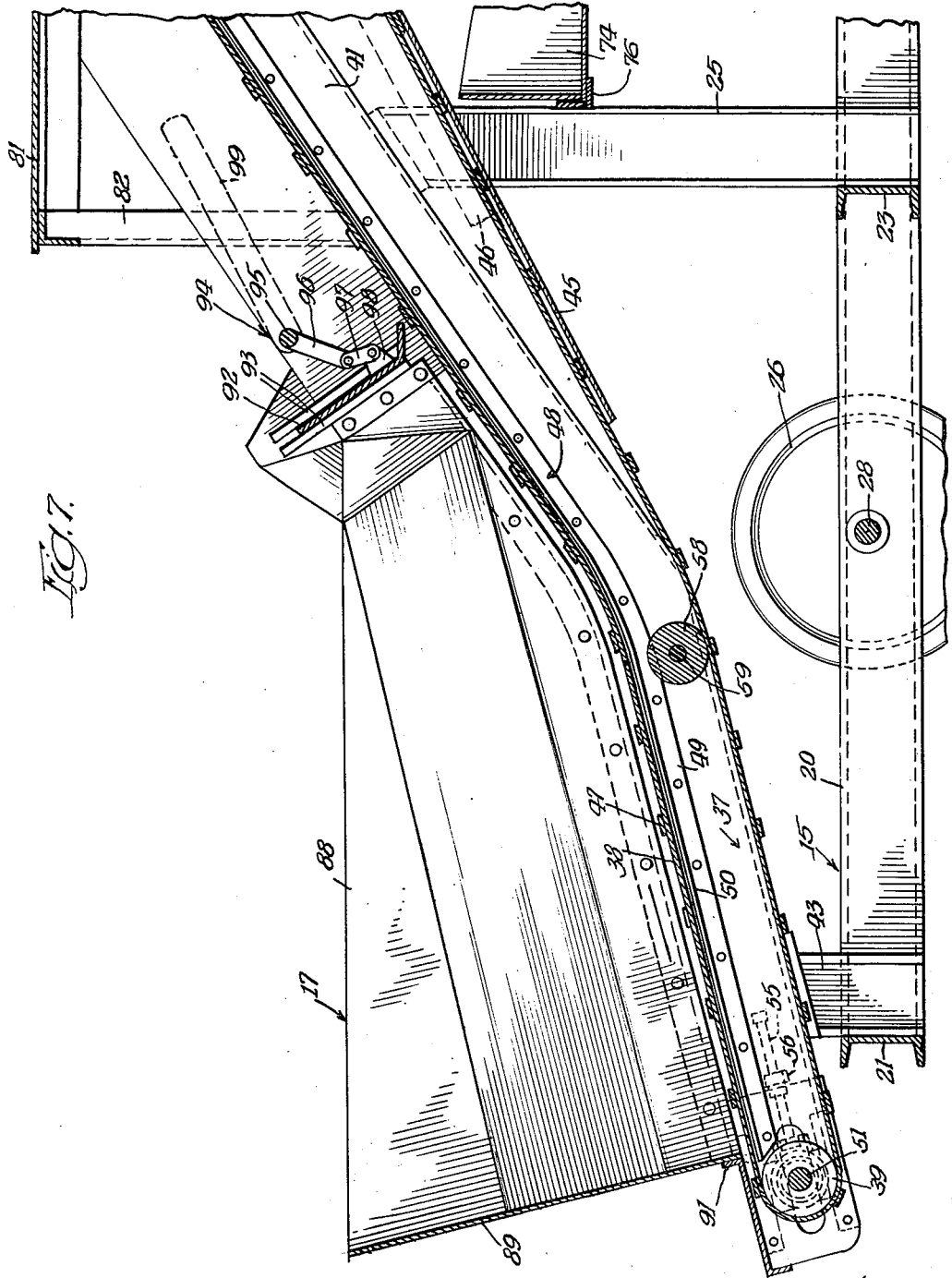

May 17, 1955   C. V. NASS ET AL   2,708,513
SAND HANDLING APPARATUS
Filed May 4, 1951   8 Sheets-Sheet 6
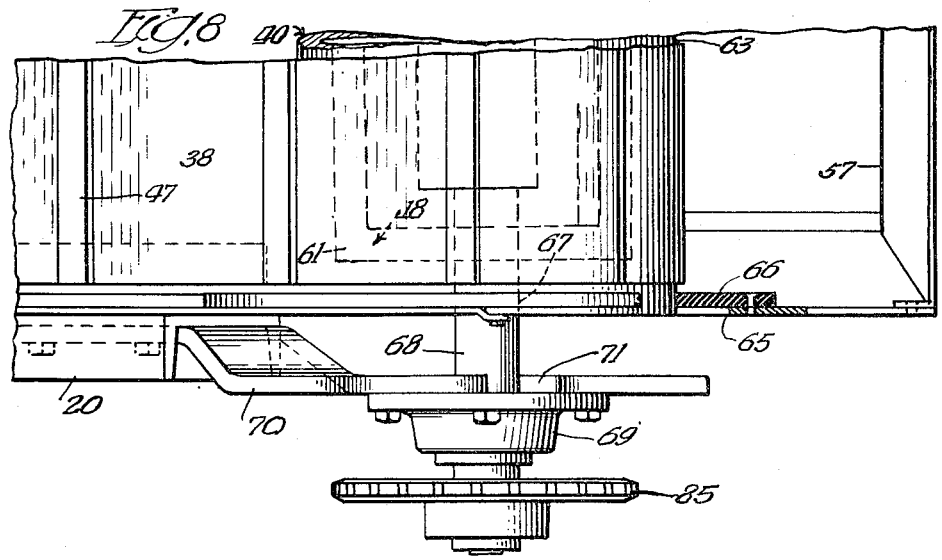
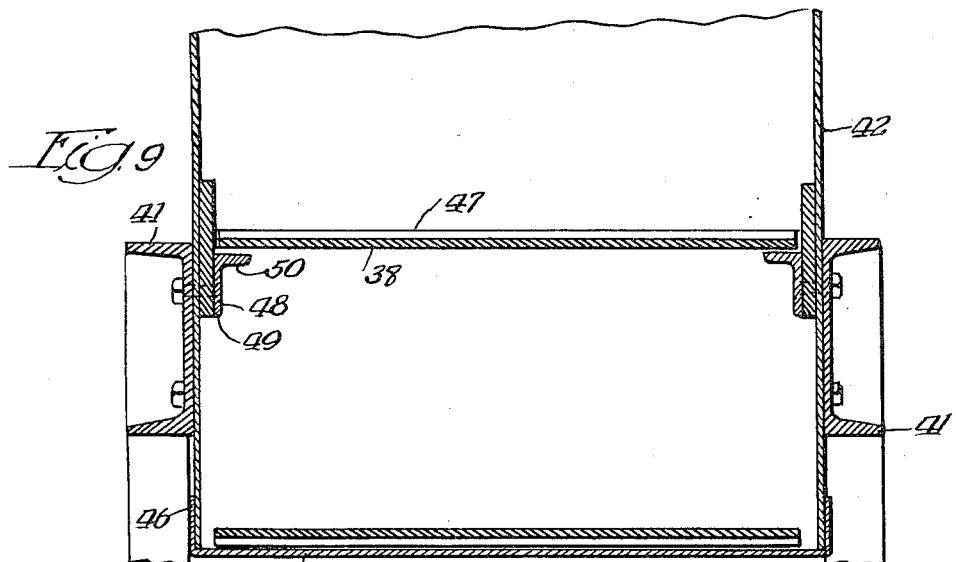
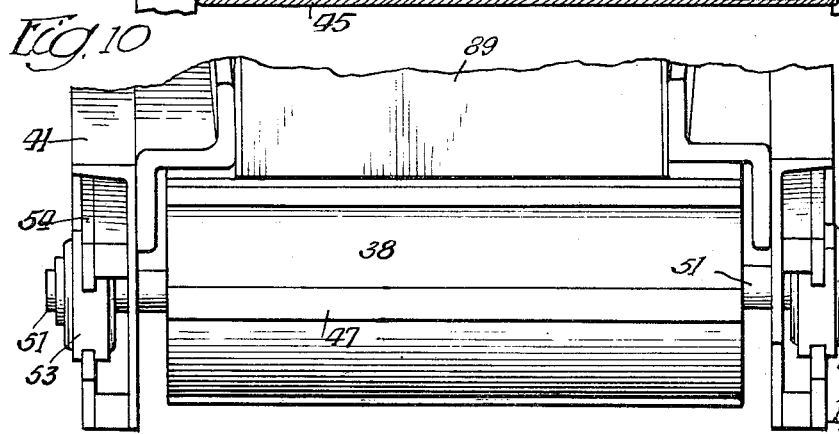
Inventors
Chester V. Nass
Hugo L. Kuehlthau
By
Atty.

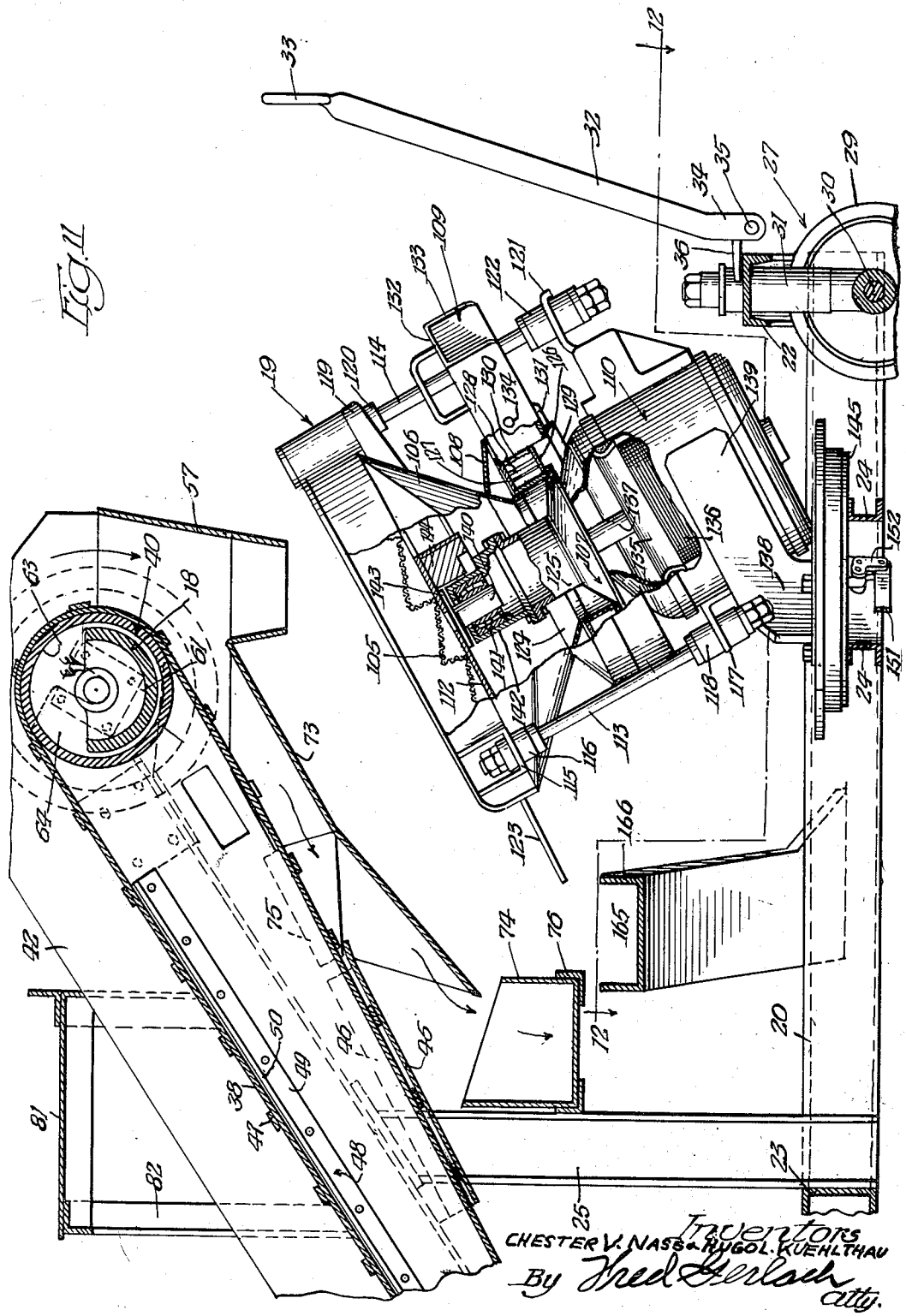

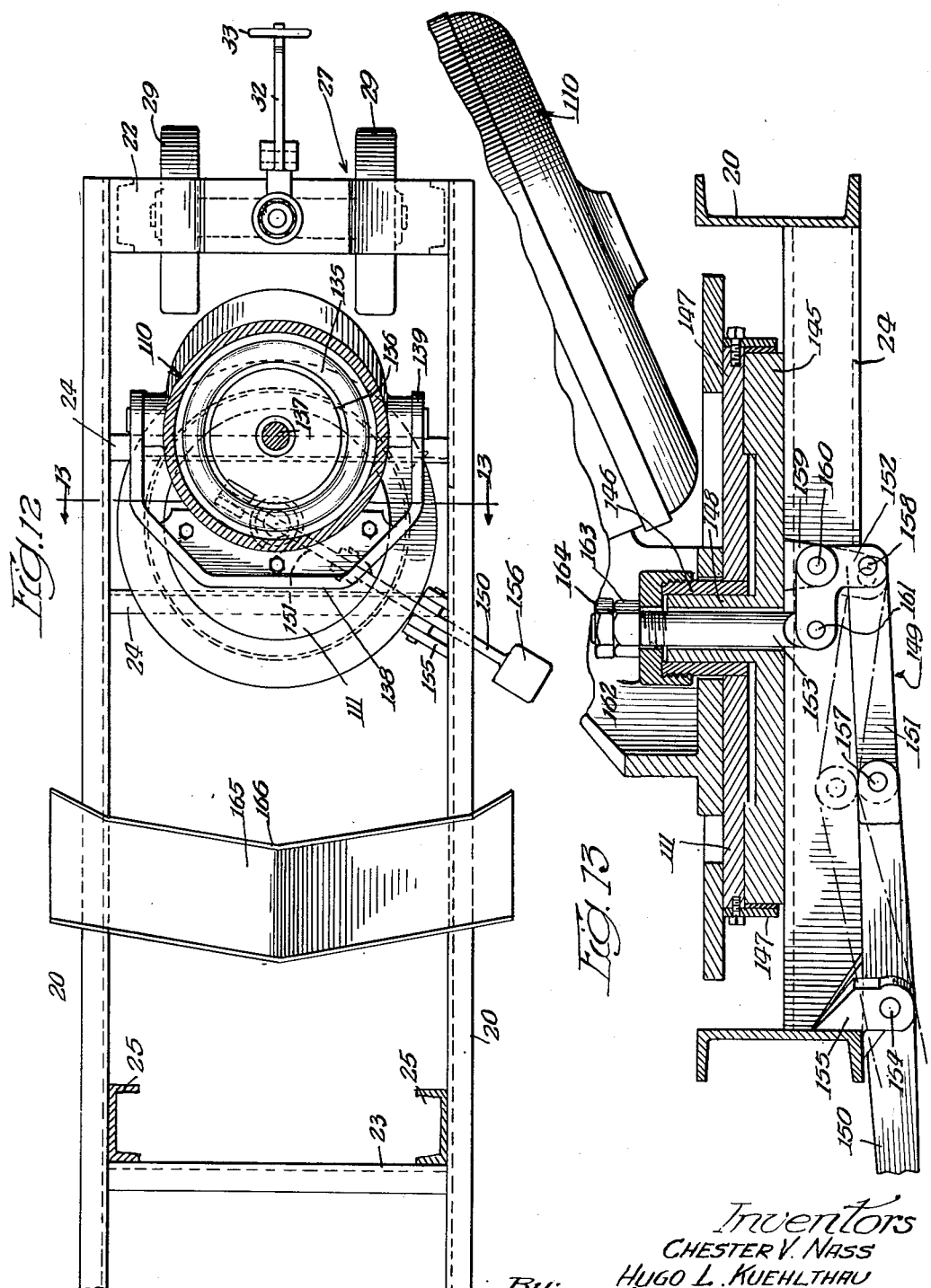

United States Patent Office

2,708,513
Patented May 17, 1955

2,708,513

SAND HANDLING APPARATUS

Chester V. Nass, Oak Park, and Hugo L. Kuehlthau, Elmhurst, Ill., assignors to Pettibone Mulliken Corporation, Chicago, Ill., a corporation of Delaware Application May 4, 1951, Serial No. 224,554

1 Claim. (Cl. 209—38)

The present invention relates generally to apparatus for handling molding sand. More particularly the invention relates to that type of apparatus which is designed for use in a foundry, operates when in use successively to accumulate, condition and discharge previously used molding sand preparatory to re-use, and as its principal parts or components comprises: (1) a horizontally elongated wheel equipped carriage which is adapted to be moved to different locations on the floor of the foundry in which the apparatus is used; (2) a self-contained motor driven unit which is positioned at the rear end of the carriage, serves to screen and aerate the sand and also to discharge the sand in stream form, embodies a gyratory screen, a blade equipped rotor, a housing around the rotor and a discharge spout on the housing, and is mounted on the carriage so that it is bodily rotatable about a vertical axis in order to position the discharge spout so that it faces rearwards or to either side of the carriage; (3) a horizontally disposed rotary magnetic separator which overlies the gyratory screen of the self-contained screening, aerating, and discharge unit and serves to rid the sand of metallic objects before it is delivered to the screen; and (4) an elongated motor driven conveyor which is mounted on, and extends lengthwise of, the front and central portions of the carriage and operates when driven to convey the sand upwards to the rotary magnetic separator.

One object of the invention is to provide a sand handling apparatus of this type which is an improvement upon, has certain inherent advantages over, and is more simple in construction than, previously designed apparatuses of the same general character and for the same purpose, including that which is disclosed in, and forms the subject matter of, United States patent application Serial No. 86,342, filed on April 8, 1949, by George J. Koren (now United States Patent No. 2,650,396).

Another object of the invention is to provide a sand handling apparatus of the type and character under consideration in which the elongated motor driven conveyor for delivering the sand to be conditioned to the rotary magnetic separator is in the form of an upwardly and rearwardly inclined, endless, flight equipped belt conveyor and the magnetic separator comprises in addition to a staionary electromagnet a rotary power driven drum which surrounds the electromagnet, supports the upper discharge end of the belt conveyor and serves when driven to drive the conveyor.

Another object of the invention is to provide a sand handling apparatus of the last mentioned character which comprises an elongated hopper which overlies, and extends lengthwise of, the receiving end of the belt conveyor and is adapted to have a batch of sand to be conditioned introduced into it by a power shovel or other means.

Another object of the invention is to provide a sand handling apparatus of the type and character last mentioned in which the inner end of the sand receiving hopper is in the form of a gate which extends transversely across the central portion of the upper reach of the endless belt conveyor and is upwardly and downwardly adjustable in order to control the layer of sand which is fed on the upper reach of the conveyor from the hopper to the rotary magnetic separator.

A further object of the invention is to provide a sand handling apparatus of the type under consideration in which the motor for driving the rotary drum of the magnetic separator is mounted on a platform over the discharge end of the endless belt conveyor to the end that it does not increase the width of the apparatus and is not likely to be contacted by the sand being handled by the apparatus.

A still further object of the invention is to provide a sand handling apparatus which is generally of new and improved construction, embodies a novel arrangement of parts and is characterized by the fact that it effectively and efficiently fulfills its intended purpose while at the same time it may be operated with facility.

Other objects of the invention and the various advantages and characteristics of the present apparatus for handling molding sand will be apparent from a consideration of the following detailed description.

The invention consists in the several novel features which are hereinafter set forth and are more particularly defined by the claim at the conclusion hereof.

In the drawings which accompany and form a part of this specification or disclosure and in which like numerals of reference denote corresponding parts throughout the several views:

Figure 1 is a left hand front perspective view of a sand handling apparatus embodying the invention;

Figure 2 is a right hand side elevation of the apparatus;

Figure 3 is a plan view;

Figure 4 is an enlarged fragmentary right hand side elevation of the inner end of the sand receiving hopper, illustrating in detail certain of the parts of the mechanism for controlling and adjusting up and down the gate at the inner end of the hopper;

Figure 5 is a front view of the apparatus illustrating in detail the position and manner of mounting the motor for driving the rotary drum of the magnetic separator;

Figure 6 is a section on the line 6—6 of Figure 4;

Figure 7 is a vertical longitudinal section of the front and central portions of the apparatus;

Figure 8 is an enlarged fragmentary plan of the rotary power driven magnetic separator and the upper or discharge end of the endless belt conveyor;

Figure 9 is an enlarged transverse section taken on the line 9—9 of Figure 2 and showing in detail the manner in which the upper and lower reaches of the endless belt conveyor are supported;

Figure 10 is an enlarged front view of the receiving end of the conveyor;

Figure 11 is a view showing the upper or discharge end of the endless conveyor in vertical longitudinal section and the self-contained screening, aerating and discharging unit partly in section and partly in side elevation;

Figure 12 is a horizontal section taken on the line 12—12 of Figure 11 and illustrating the manner in which the unit is rotatably mounted on the rear end of the wheel equipped carriage; and Figure 13 is a vertical section taken on the line 13—13 of Figure 12 and showing in detail the releasable mechanism for locking the self-contained unit in the various positions into which it is turned or adjusted.

The apparatus which is shown in the drawings constitutes the preferred form or embodiment of the invention. It is designed for use in a foundry and serves as a medium or instrumentality for handling and conditioning previously used molding sand preparatory to reuse in flasks. As its principal parts or components the apparatus comprises a wheel equipped carriage 15, a belt conveyor 16, a sand receiving hopper 17, a rotary magnetic separator 18, and a self-contained sand screening, aerating and discharging unit 19. The belt conveyor, hopper, magnetic separator and self-contained unit are mounted on the carriage and function and are arranged as hereinafter described in detail.

*Carriage*

The carriage 15 of the apparatus is horizontally elongated and embodies a pair of horizontally extending, parallel, spaced apart side beams 20, a front crossbeam 21, a rear crossbeam 22, an intermediate crossbeam 23 and a pair of intermediate crossbeams 24. Preferably these beams are all channel beams. The side beams 20 of the carriage are held in fixed, spaced apart relation by the aforementioned crossbeams and are straight from end to end. The front crossbeam 21 extends between, and has its ends welded to, the front ends of the side beams 20. The rear crossbeam 22 is arched and has its ends welded or otherwise fixedly secured to the rear ends of the side beams. The crossbeam 23 is disposed substantially midway between the front crossbeam 21 and the rear crossbeam 22 and extends between, and has its ends welded to, the central portions of the side beams 20. The crossbeams 24 of the carriage are located between, and are disposed in parallel relation with, the rear crossbeam 22 and the crossbeam 23. They are spaced a small distance apart and have the ends thereof welded to the adjacent portions of the webs of the side beams 20.

In addition to the side and crossbeams the carriage comprises a pair of upright beams 25, a pair of front wheels 26 and a dirigible wheel assembly 27. The upright beams 25 are located at the central portion of the carriage and are spaced laterally apart. They serve as part of the supporting means for the belt conveyor 16 and have the lower ends thereof welded or otherwise fixedly secured to the central portions of the webs of the side beams 20. The crossbeam 23 is preferably located directly in front of the lower ends of the upright beams 25. The front wheels 26 serve movably to support the front end of the carriage and are rotatably mounted on the outer ends of a horizontally extending axle 28. The latter is located substantially midway between the front crossbeam 21 and the crossbeam 23 and extends at right angles to the side beams 20. The portions of the axle that are directly inwards of the front wheels 26 extend through holes in the side beams and are fixedly secured to the hole defining portions of the beams. The front wheels 26 have solid rubber tires and are of such diameter that they support the front end of the carriage a comparatively small distance above the floor of the foundry in which the apparatus is used. The dirigible wheel assembly 27 serves to support the rear end of the carriage and for the most part is disposed beneath the arched rear crossbeam 22. It is of unitary character and comprises a pair of side by side tire equipped wheels 29, a horizontally extending axle 30, an inverted T-shaped axle carrying frame 31 and a tongue 32. The wheels 29 of the assembly 27 are rotatably mounted on the ends of the axle 30 and are adapted to engage and roll on the foundry floor. The axle 30 extends longitudinally through the crosspiece of the inverted T-shaped frame 31. The vertically extending piece of such frame extends through, and is suitably rotatably mounted in a hole in the central portion of the arched rear crossbeam 22 in order that the frame together with the axle and wheels is permitted to turn about a vertical axis. The tongue 32 has a handle 33 at one end thereof. The other end of the handle embodies a fork 34 which is pivotally connected by a horizontally extending pin 35 to the outer end of a fixed radially extending lug 36 on the upper end of the vertically extending piece of the frame 31. The pivot pin 35 so connects the tongue to the frame 31 that the tongue is permitted to swing upwards and downwards and when swung sidewise serves correspondingly to turn the frame together with the axle 30 and the wheels 29. The apparatus as a whole may be transported from place to place by pulling or pushing it by way of the tongue 32. Inasmuch as the wheel assembly 27 is dirigible the apparatus may be turned in either direction as well as moved rectilinearly.

*Belt conveyor*

The belt conveyor 16 serves to elevate and feed to the magnetic separator 18 the sand to be conditioned. It comprises an elongated upwardly and rearwardly inclined frame 37, an endless belt 38, a belt supporting roller 39 and a belt supporting and driving drum 40.

The conveyor frame 37 overlies, and extends lengthwise of, the front end and central portions of the carriage and comprises a pair of parallel, laterally spaced, channel variety side beams 41, and a pair of side plates 42. The side beams are arranged so that the flanges thereof project outwards and have the front ends thereof connected to, and supported on, the upper ends of a pair of short, vertically extending, channel variety members 43. The lower ends of such members are welded or otherwise fixedly secured to the front ends of the side beams 20 of the carriage 15 and are located directly behind the ends of the front crossbeam 21. The front extremities of the side beams 41 project forwards of the members 43 and are cross connected by a flanged plate 44. The front end portions of the side beams 41 are upwardly and rearwardly inclined at a comparatively small angle with respect to the horizontal and the rear end portions of such side beams are inclined upwards and rearwards at a greater angle. The intermediate parts of the rear end portions of the side beams 41 rest on, and are bolted or otherwise fixedly connected to, the upper ends of the upright beams 25 of the carriage. The side plates 42 of the conveyor frame 37 are spaced laterally apart and fit against, and are welded or otherwise fixedly secured to, the rear end portions of the webs of the side beams 41. The front ends of the side plates terminate a small distance in front of the upright beams 25 of the carriage and the rear ends of the side plates project rearwards beyond the rear extremities of the side beams 41. An upwardly and rearwardly inclined pan 45 underlies the front lower marginal portions of the side plates 42 and this pan has upwardly extending side flanges 46 which are welded or otherwise fixedly secured to said front lower marginal portions.

The endless belt 38 of the belt conveyor 16 is formed of any suitable flexible material and consists of spaced apart upper and lower reaches. It is disposed between the side beams 41 of the conveyor frame 37 and has affixed to the outer surface thereof bar variety flights 47. The latter extend transversely of the belt. They are spaced equidistantly apart and have a twofold purpose in that they serve not only to reenforce the belt against transverse flexure but also to engage the sand on the upper reach of the belt. The side margins of the upper reach of the belt 38 are supported by a pair of laterally spaced angle bars 48. The latter extend lengthwise of the side beams 41 of the conveyor frame and consist of downwardly extending legs 49 and inwardly extending legs 50. The downwardly extending legs of the angle bars 48 are riveted, welded or otherwise fixedly secured to the inner surfaces of the webs of the side beams 41 and the inwardly extending legs underlie, and serve slidably to support, the side margins of the upper reach of the belt.

The belt supporting roller 39 extends horizontally and is disposed between the front ends of the side beams 41 of the conveyor frame 37. It has the front lower end of the endless belt 38 trained around it and embodies at its ends outwardly extending trunnions 51 which extend through longitudinally extending slots 52 in the front extremities of the webs of the side beams 41 and are journalled in bearing blocks 53. The latter are mounted for fore and aft sliding movement between angle bar variety guides 54 and have associated with them adjusting screws 55 which extend through internally threaded holes in a pair of laterally extending lugs 56 on the front end portions of the webs of the side beams 41. When the screws 55 are turned in one direction they slide the bearing blocks 53 forwards for belt tightening purposes and when they are turned in the opposite direction they slide the bearing blocks rearward and effect loosening of the belt.

The drum 40 extends horizontally between the rear ends of the side plates 42 of the conveyor frame 37 and has the rear end of the endless belt 38 trained around it. It forms part of the magnetic separator 18 and serves when driven to drive the belt. It is contemplated that the drum will be driven in a clockwise direction as viewed in Figure 11. When it is driven in such direction the upper reach of the belt travels upwards and rearwards and the lower reach of the belt travels downwards and forwards. The sand on the upper reach of the belt, after passing around the drum 40, is discharged downwards through a tubular chute 57 which is connected to, and extends between, the rear ends of the side plates 42 of the conveyor frame 37.

In addition to the parts heretofore mentioned the belt conveyor 16 comprises a horizontally extending idler roller 58 for guiding the central portion of the lower reach of the endless belt 38. This roller is disposed between the central portions of the angle bars 48 and has an axle 59, the ends of which are journalled in bearings 60 on the central portions of the webs of the side beams 41.

Magnetic separator

The magnetic separator 18 comprises in addition to the drum 40 an electromagnet 61 and power mechanism 62 for driving the drum and effecting resultant drive of the endless belt 38 of the conveyor 16. The drum 40 is hollow and comprises a cylindrical side wall 63 and a pair of circular end walls 64. The ends of the side wall of the drum extend through over-sized circular holes 65 in the rear ends of the side plates 42 and are closely surrounded by rubber rings 66, the outer margins of which are riveted to the portions of the side plates that define the holes 65. The end walls 64 of the drum 40 extend across, and are fixedly secured to, the ends of the side wall 63 and have holes 67 in their central portions. The drum 40 is rotatably supported by way of a pair of coaxial trunnions 68. The central portions of these trunnions extend through the holes 67 and are fixedly secured to the portions of the end walls 64 that define such holes. The outer ends of the trunnions extend through, and are journalled in, a pair of bearings 69 and these are mounted on the outer ends of a pair of brackets 70 so that they are laterally adjustable in order to vary in a sidewise manner the position of the drum 40. The brackets 70 have the inner ends thereof fixedly secured to the rear ends of the side beams 41 of the conveyor frame 37 and have in their outer ends longitudinally extending slots 71 for accommodating the adjacent portions of the trunnions 68. The electromagnet 61 is disposed within the drum 40 and is in the form of a core and windings. It extends throughout an arc of approximately 180° and is loosely mounted on the inner ends of the trunnions 68 in order that it remains stationary during drive of the drum. The left hand trunnion as viewed from the front of the apparatus is tubular in order to accommodate conductors which lead to the windings of the electromagnet 61 from a rectifier 72 which is mounted on the outer end of one of the brackets 70 as shown in Figure 1. When the belt conveyor is in operation as the result of drive of the drum 40 the layer of sand as it reaches the discharge end of the upper reach of the endless belt 38 travels part way around the drum and then flows downwards in stream form through the chute 57 which, as best shown in Figure 11, underlies the lower rear portion of the drum. If there are any metallic objects in the sand such objects, due to the action of the electromagnet 61, adhere to the endless belt and are conveyed by the latter downwards and forwards past the discharge chute 57. As soon as such objects in connection with travel on the upper end of the lower reach of the belt pass out of the influence of the magnet they drop onto a downwardly and forwardly inclined discharge chute 73 and are guided by such chute into a removable container 74. The discharge chute 73 extends between the front portion of the depending chute 57 and the upper rear end of the pan 45 and has side flanges 75 which are suitably fixedly secured to the central lower portions of the side plates 42 of the conveyor frame 37. The container 74 normally underlies the lower discharge end of the chute 73 and is supported by a rectangular, horizontally extending angle bar frame 76 which is connected to, and projects rearwards from, the central portions of the upright beams 25 of the carriage 15. When it is desired to remove the container 74 so as to discharge accumulated objects therefrom the container is raised with respect to the frame 76 and is then shifted laterally.

The power mechanism 62 for driving the drum 40 comprises an electric motor 77, a gear variety speed reducing unit 78 and a sprocket and chain connection 79 between the unit 78 and the right hand trunnion 68. The motor 77 is positioned so that its armature shaft is disposed horizontally and extends transversely of the apparatus. It receives current from a switch box 80 and is fixedly mounted on a horizontally extending, rectangular platform 81. The latter overlies the central portion of the side plates 42 of the conveyor frame 37 and is supported by four angle bar variety standards 82. The lower ends of the standards are fixedly secured to the upper flanges of the side beams 41 of the conveyor frame and the upper ends of the standards are suitably secured to the corners of the platform. As a result of the fact that the electric motor 77 is mounted on the platform 81 the motor does not increase the over-all width of the apparatus and is not likely to have sand accumulate on it. The speed reducing unit 78 is mounted on one end of the casing of the electric motor 77 and embodies a drive shaft (not shown) and a coaxial driven shaft 83. The drive shaft is connected to the armature shaft of the motor. The driven shaft 83 of the unit 78 projects in the same direction as the right hand trunnion 68, as shown in Figure 2 of the drawings. The sprocket and chain connection 79 comprises a small sized sprocket 84 on the outer end of the driven shaft of the speed reducing unit 78, a large sized sprocket 85 on the outer end of the right hand trunnion 68 and an endless chain 86 around the two sprockets. A suitably supported sheet metal housing 87 surrounds the sprocket and chain connection 79 and serves as a guard for the latter.

Hopper

The hopper 17 of the apparatus is located over the front end of the belt conveyor 16 and is adapted to have introduced into it a batch of sand to be conditioned. It is formed of plate metal and comprises a pair of side walls 88 and a front wall 89. The upper portions of the side walls 88 extend vertically. They are disposed in parallel relation and are spaced apart a distance in excess of the width of the endless belt 38. The central portions of the hopper side walls are downwardly and inwardly inclined and the lower portions of the side walls extend vertically and are connected to the upper portions of the front ends of the side beams 41 of the conveyor frame 37 by angle bar brackets 90. The rear ends of the hopper side walls are belt inwards and are suitably connected to the front upper corners of the side plates 42 of the conveyor frame 37. The front wall 89 of the hopper 17 extends across, and is secured to, the front ends of the side walls 88 and has the bottom margin thereof welded or otherwise fixedly secured to an upwardly extending flange 91 on the plate 44. It is contemplated that the sand to be conditioned may be introduced into the hopper 17 in any manner whatsoever. The size and height of the hopper are such that the sand to be conditioned may be introduced into the hopper by way of a tiltable shovel of the type that is mounted on an engine driven truck and is hydraulically manipulated.

At the rear end of the hopper 17 is an upwardly and downwardly adjustable sand controlling gate 92. This gate forms, in effect, the rear end wall of the hopper and extends over and transversely of the central portion of the upper reach of the endless belt 38. The end margins of the gate fit slidably between upwardly and forwardly inclined pairs of guide bars 93 in order that the gate may be raised and lowered with respect to the upper reach of the conveyor belt. As best shown in Figure 7, the guide bars 93 are connected to the front ends of the side plates 42. By sliding the gate upwards or downwards with respect to the upper reach of the belt the height of the layer of sand that is fed on the upper reach of the belt from the hopper 17 to the depending discharge chute 57 may be controlled or varied as desired.

Associated with the gate 92 is manually manipulable mechanism 94 for controlling sliding movement of the gate. Such mechanism comprises a horizontally extending rock shaft 95, a pair of arms 96, a pair of links 97 and a pair of lugs 98. The rock shaft 95 extends transversely of the apparatus and is located directly rearwards of the gate 92. The ends of the rock shaft extend through, and project beyond, holes in the front upper corners of the side plates 42 of the conveyor frame 37. On the right hand extremity of the rock shaft is a radially extending hand lever 99 whereby the shaft may be rocked manually back and forth. The arms 96 of the mechanism 94 are located directly inwards of the front upper corners of the side plates 42 and are fixedly connected to, and project radially from, the rock shaft. The links 97 extend downwards and have the upper ends thereof pivotally connected to the distal ends of the arms 96. The lower ends of the links 97 are pivotally connected to the lugs 98 which, as shown in Figure 7, are connected to, and project rearwards from, the lower portion of the gate 92. When the shaft 95 is rocked in a clockwise direction as viewed in Figure 7 the gate is shifted upwards and when the shaft is rocked in a counterclockwise direction the gate is shifted or slid downwards. The end of the rock shaft that has applied to it the hand lever 99 is provided with a forwardly and downwardly extending rigid arm 100 which coacts with a stop pin 101 to hold the gate in the various positions into which it is shifted or adjusted. The stop pin 101 is adapted to fit in any one of a series of holes 102 in the front upper corner of the adjacent side plate 42. It is adapted to underlie the outer or distal end of the arm 100 and when engaged by the arm prevents the arm, together with the gate, from moving downwards. When the stop pin is inserted into one of the higher holes the gate is held a substantial distance away from the upper reach of the conveyor belt and when the pin is inserted into one of the lower holes the gate is held or maintained close to the upper reach of the belt. An upwardly extending helical tension spring 103 serves yieldingly to hold the arm 100 in engagement with the stop pin 101. The lower end of this spring is connected to the eye of an eye-bolt 104 and the upper end of the spring is connected to the distal end of the arm 100. When it is desired to slide or adjust the gate upwards the hand lever 99 is swung in a clockwise direction as viewed in Figures 2 and 7 and until the gate is raised to the proper extent. Thereafter the stop pin 101 is inserted into whatever hole is directly beneath the outer end of the arm 100. When the hand lever is released the tension spring 103 holds the arm 100 in abutment with the stop pin and thus maintains the gate in its adjusted position.

As shown in Figure 7 of the drawings, the lower marginal portion of the gate 92 is bent or angled rearwards and downwards so that it extends at approximately a 45° angle with respect to the upper reach of the conveyor belt. The bent or angled portion of the gate, when contacted by hard lumps of sand, will cam the gate upwards against the force of the tension spring 103 to the end that the lumps pass under the gate and do not so jam between the upper reach of the belt and the gate as to stop drive of the belt. As soon as the lumps pass under the gate the spring returns the gate automatically to its adjusted position as determined by the pin 101.

*Screening, aerating and discharging unit*

The unit 19 is located at the rear end of the carriage 15 and is positioned to receive sand from the depending discharge chute 57. It is essentially self-contained, serves in addition to screening and aerating the sand to discharge the sand in stream form into a pile for purposes of re-use, and comprises a gyratory screen 105, a hopper 106, a blade equipped rotor 107, a housing 108 around the rotor, a discharge spout 109 on the housing, an electric motor 110 for driving the rotor and gyrating the screen. As best shown in Figures 2 and 11 the unit is inclined at an angle with respect to the vertical to the end that the gyratory screen 105 slopes downwards. An annular or ring-shaped turntable 111 serves, together with hereinafter recited additional parts, to support the unit so that it is bodily rotatable about a vertical axis throughout an arc of approximately 180°.

The screen 105 of the unit 19 is removably mounted in a rectangular frame 112 and, as shown in Figure 11, is zigzag in cross section from the upper portion thereof to its lower portion.

The hopper has the frame 112 connected to its upper end and is yieldingly supported by way of a pair of posts 113 and a single post 114. The posts 113 are upwardly inclined and extend at right angles to the frame 112. The upper ends of the posts 113 extend loosely through laterally extending lugs 115 on certain corners of the upper portion of the hopper 106 and have rubber collars 116 in straddled relation with said lugs. The lower ends of the posts 113 extend loosely through the ends of a horizontally extending angle bar 117 and have rubber collars 118 in straddled relation with the ends of the angle bar. As shown in Figure 11, such bar is connected to the casing of the electric motor 110 and extends tangentially thereto. The post 114 is in parallel relation with the posts 113. The upper end of the post 114 extends loosely through a laterally extending lug 119 on the upper portion of the hopper 106 and has rubber collars 120 in straddled relation with such lug. The lower end of the post 114 extends loosely through a laterally extending lug 121 on the casing of the motor 110 and has rubber collars 122 in straddled relation with the lug 121. The rubber collars on the posts 113 and the post 114 permit the hopper 106 together with the screen 105 to gyrate. When the screen is gyrated as hereinafter described, the sand that is discharged onto the screen from the depending discharge chute 57 passes for the most part through the screen and any large sized non-magnetic foreign objects are separated therefrom and travel downwards across the screen to a discharge lip 123 on the lower portion of the upper end of the hopper 106. The separated objects, due to the gyratory action of the screen, pass over the lip 123 and drop by gravity. The upper end of the hopper 106 is rectangular in cross section and its intermediate portion and lower end are downwardly tapered. The hopper embodies at its lower end a flange-formed annular discharge 124 and serves to direct the screened sand into the central portion of the interior of the blade equipped rotor 107.

The rotor of the unit 19 is located directly beneath the hopper 106 and comprises an elongated hub part 125, a bottom ring 126, a top ring 127 and an annular series of vertically extending blades 128 between the bottom and top rings. When the unit is in operation as the result of drive of the electric motor 110 the screened sand that is discharged from the hopper 106 into the central portion of the interior of the rotor is directed outwards by centrifugal force and is flung outwards by the blades 128.

The housing 108 is suitably connected to the upper end of the casing of the electric motor 110 and consists of a cast metal cylindrical side wall 129 and an arcuate liner 130. The liner extends around the inner periphery of the side wall 129 and is formed of suitable wear resistant material. It surrounds and extends between the outer margins of the bottom and top rings 126 and 127 of the rotor and serves to confine the sand that is flung outwards by the rotor blades 128. The side wall 129 of the housing has a discharge opening (not shown) adjacent the ends of the arcuate liner and embodies at the sides of the discharge opening a pair of outwardly extending ears 131. When the unit is in operation the sand that is flung outwards by the blades 128 of the rotor travels around the liner 130 until it reaches the aforementioned discharge opening in the side wall of the housing. At such point it is flung forcibly outwards in stream form through the discharge opening and past the ears 131. The aforementioned discharge opening in the side wall 129 of the housing 108 is located at the high portion of the housing and is at one side of the post 114.

The discharge spout 109 serves to guide the stream of sand emanating from the discharge opening in the housing and consists of a top wall 132 and a pair of side walls 133. The side walls 133 are connected to, and depend from, the side margins of the top wall and have the inner ends thereof pivotally connected to the outer ends of the ears 131 by pivot bolts 134 in order that the spout may be swung upwards and downwards in order to direct as desired the stream of sand resulting from operation of the blade equipped rotor 107. When the spout 109 is swung upwards the stream travels a comparatively great distance and when the spout is swung downwards the length of the stream is materially reduced.

The electric motor 110 comprises in addition to the casing an annular stator 135 and a rotor 136 within the stator. The rotor is mounted on an upwardly inclined shaft 137, the lower end of which is journalled in an antifriction bearing in the lower end wall of the motor casing. The upper end of the shaft 137 extends into, and is suitably fixedly secured to, the hub part 125 of the rotor 107 to the end that the blade equipped rotor is driven in response to the rotor 136 of the motor 110. As best shown in Figures 2, 11, and 12, the motor is mounted on the turntable 111 by way of a bracket 138. The latter is fixedly secured by bolts to the turntable and embodies an upwardly inclined U-shaped member 139 which extends part way around the side wall of the casing of the motor 110 and has the ends thereof fixedly secured to diametrically opposite portions of the motor casing side wall.

The screen 105 is gyrated for screening purposes by means of an upwardly inclined shaft 140. The latter is located above the motor shaft 137 and fits snugly within the inner race of a roller bearing 141. The outer race of such bearing is mounted in a cap 142 which is bolted to the upper end of the hub part 125 of the blade equipped rotor 107. The upper end of the shaft is provided with an enlarged head 143 which is suitably secured to the central portion of the hopper 106. The roller bearing 141 is positioned eccentrically of the motor shaft 137 with the result that when the motor 110 is in operation the shaft 140 revolves in a circular course around the axis of the motor shaft 137 and serves to gyrate the hopper 106 and the screen 105. A counterweight 144 is connected to one side of the cap 142 for balancing purposes.

The annular turntable 111 of the unit 19 rests on, and is supported by, an annular bed-plate 145 which, in turn, rests on, and is secured to, the pair of crossbeams 24 of the carriage 15. It is provided at its inner margin with an upwardly extending sleeve 146 and embodies at its outer margin a depending rim 147 which surrounds the outer periphery of the annular bed-plate 145 and serves to hold the turntable against lateral displacement with respect to the bed-plate while at the same time permitting the turntable to turn or rotate on the bed-plate. The inner marginal portion of the bed-plate is provided with an integral, upstanding sleeve 148 which fits loosely within the sleeve 146, as shown in Figure 13. In order releasably to retain the turntable 111 and unit 19 in the various positions into which they are turned locking mechanism 149 is provided. This mechanism comprises a foot lever 150, a toggle link 151, a bell crank 152 and a tension rod 153. The foot lever 150 extends radially with respect to the annular bed-plate 145 and is arranged so that the central portion thereof underlies one of the side beams 20 of the carriage 15. Such central portion of the foot lever is pivotally mounted on a horizontally extending pivot pin 154 in order that the lever is permitted to swing or rock in a vertical plane. The pin 154 is connected to a depending lug 155 on the one carriage side beam. The outer end of the lever 150 is provided with a foot pedal 156. The toggle link 151 of the releasable locking mechanism 149 is disposed inwards of the foot lever 150 and has the outer end thereof pivotally connected to the inner end of the foot lever by a pivot pin 157. The inner end of the toggle link is pivotally connected by a horizontal pivot pin 158 to one arm of the bell crank 152. Such bell crank has the central portion thereof pivotally connected to an eccentrically disposed depending lug 159 on the bed-plate 145 by a horizontally extending pivot pin 160 in order that the bell crank is permitted to rock or turn back and forth in a vertical plane. The bell crank embodies a depending arm and a horizontally extending arm. The depending arm of the bell crank carries the pivot pin 158 for the inner end of the toggle link 151. The tension rod 153 of the locking mechanism 149 extends vertically and loosely through the upstanding sleeve 148 on the inner marginal portion of the bed-plate 145 and has its lower end pivotally connected to the outer end of the horizontally extending arm of the bell crank 152 by a horizontally extending pivot pin 161. The upper end of the tension rod 153 extends loosely through a hole in a screw cap 162 and has mounted thereon a nut 163 and a lock nut 164. The cap screw 162 surrounds, and is secured by a screw thread connection to, the upper end of the upwardly extending sleeve 146. When the foot lever 150 is tilted in a counterclockwise direction as viewed in Figure 13 it operates through the medium of the toggle link 151 and the bell crank 152 to raise the tension rod 153 so that it exerts no downward pressure on the turntable 111 and thus permits the turntable to be turned. However, when the foot lever 150 is tilted in a clockwise direction as viewed in Figure 13 it operates through the medium of the toggle link and the bell crank to shift the tension rod 153 downwards so that it, in turn, operates through the medium of the nut 163, the screw cap 162 and the sleeve 146 to clamp the turntable 111 against the annular bed-plate 145. The foot pedal 150 and the toggle link 151 are so arranged that when the foot lever is tilted in a clockwise direction in order to effect locking or clamping of the turntable they assume a dead center position as shown in full lines in Figure 13.

Associated with the self-contained screening, aerating and discharging unit 19 is an inverted V-shaped chute 165. The latter is located between the unit 19 and the upright beams 25 and is adapted to catch and direct to either side of the carriage the non-magnetic foreign objects which drop from the discharge lip 123 when the unit 16 is positioned so that the discharge spout 133 faces rearwards. The ends of the inverted V-shaped chute 165 are suitably fixedly secured to the upper flanges of the side beams 20 of the carriage 15. The chute 165 is preferably in the form of a channel beam and has upstanding flanges 166 along its side margins.

Operation

When it is desired to use the apparatus a batch of sand to be conditioned is introduced into the hopper on the front end of the carriage 15. As soon as the hopper is filled to the desired extent the switches for the electric motors 77 and 110 are closed. This results in drive of the endless belt 38 of the belt conveyor 16 and operation of the unit 19. In connection with drive of the endless belt sand in the form of a thin layer on the upper reach of the belt is fed upwards from the hopper and then discharged downwards around the drum 40. In connection with passage of the layer of sand around the drum any magnetic objects are subjected to the action of the magnetic separator 18 and caused to slide down the chute 73 into the container 74. The sand after being rid of all magnetic objects therein flows downwards through the discharge chute 57 onto the unit 19. In connection with gyration of the screen 105 foreign non-magnetic objects are screened out of the sand and directed by the lip 123 onto the inverted V-shaped chute 166. The object-free sand, after passing through the screen 105, enters the blade equipped rotor 107 and is flung out in aerated and stream form through the discharge spout 109. The amount of sand that is discharged onto the screen 105 per second is controlled by raising or lowering the gate 92 which, as previously pointed out, forms the inner end wall of the hopper 88. By pulling or pushing the carriage by way of the handle equipped tongue 32 the apparatus may be transported from place to place in the foundry in which it is used.

The herein described sand handling apparatus effectively and efficiently fulfills its intended purpose and involves a compact and novel arrangement of parts. It is essentially simple in design, occupies but a comparatively small space and may be manipulated with facility.

Whereas the apparatus has been described as adapted for use in handling molding sand in a foundry it is to be understood that it may be used to handle and condition other granular or pulverulent material. It is also to be understood that the invention is not to be restricted to the details set forth since these may be modified within the scope of the appended claim without departing from the spirit and scope of the invention.

Having thus described the invention what we claim as new and desire to secure by Letters Patent is:

A portable apparatus designed for use in handling and conditioning sand in a foundry and comprising: a horizontally elongated carriage having ground wheels whereby it may be moved from place to place in the foundry, and embodying a pair of spaced apart side beams and a pair of spaced apart upright beams on the central portions of the side beams; an elongated upwardly and rearwardly inclined belt conveyor disposed over, and extending lengthwise of, the front end and central portions of the carriage, embodying a frame with an elevated platform directly over its rear end, and in the form of spaced apart side beams with the front ends thereof connected to the front ends of the carriage side beams and their central portions connected to the upper ends of the aforesaid upright beams, and also embodying a horizontal transversely extending roller between the front ends of the frame side beams and an endless flight-equipped belt disposed between, and extending lengthwise of, said frame side beams, consisting of upper and lower reaches, and having the front end thereof trained around said roller; an elongated longitudinally extending open top hopper mounted on the front portions of the frame side beams, having an open bottom over the front portion of the upper reach of the endless belt, adapted to receive a batch of sand and having a rear wall in the form of an upwardly and downwardly adjustable gate over the central portion of the upper reach of the belt; mechanism operative to adjust the gate and embodying a hand lever adjacent the central portion of the frame side beams; a rotary magnetic separator disposed adjacent the rear ends of the frame side beams, embodying a horizontal transversely extending rotatable drum with the rear end of the endless belt trained therearound, provided with unidirectional power means including an electric motor on the platform for rotating the drum so that it drives the belt in such manner that the upper reach of the belt feeds sand from the hopper and then over the drum, and adapted in connection with rotation of the drum by said power means to separate metallic scrap from the sand as the latter feeds over the drum; a receptacle removably mounted on the upright beams and adapted when in place to receive the scrap separated by the magnetic separator; and a self-contained sand screening, aerating and discharging unit disposed beneath, and adapted to receive sand directly from, the rear end of the belt, consisting of a gyratory screen, a blade-equipped rotor beneath the screen, a housing around the rotor and with a vertically tiltable laterally extending spout for discharging the sand in stream form, and a motor for gyrating the screen and driving the rotor, and having coacting elements between its lower portion and the subjacent portion of the rear end of the carriage whereby it is mounted so that it is capable of being rotated bodily back and forth about a vertical axis in order to position the discharge spout so that it faces rearwards or to either side of the carriage.

References Cited in the file of this patent

UNITED STATES PATENTS

| Number | Name | Date |
|---|---|---|
| 1,860,481 | Royer | May 31, 1932 |
| 1,958,351 | Shingshang | May 8, 1934 |
| 2,034,203 | Piper | Mar. 17, 1936 |
| 2,206,164 | Davies | July 2, 1940 |
| 2,452,362 | Erisman | Oct. 26, 1948 |

FOREIGN PATENTS

| Number | Country | Date |
|---|---|---|
| 600,395 | Germany | July 21, 1934 |